United States Patent [19]

Matsumoto et al.

[11] Patent Number: 5,372,976
[45] Date of Patent: Dec. 13, 1994

[54] VITREOUS CHINA, METHOD FOR PREPARING THE VITREOUS CHINA, SANITARY-WARE PRODUCED THEREFROM AND GLAZE THEREFOR

[75] Inventors: Akio Matsumoto; Toshiya Nishikawa, both of Kitakyushu, Japan

[73] Assignee: Toto Ltd., Kitakyushu, Japan

[21] Appl. No.: 100,962

[22] Filed: Aug. 3, 1993

[30] Foreign Application Priority Data

Aug. 4, 1992 [JP] Japan ................. 4-208207

[51] Int. Cl.$^5$ ............ C03C 1/00; C04B 33/24
[52] U.S. Cl. ............................ 501/32; 501/144
[58] Field of Search ............ 501/4, 5, 32, 141, 143, 501/144, 153, 154

[56] References Cited

U.S. PATENT DOCUMENTS

| | | | |
|---|---|---|---|
| 3,681,102 | 8/1972 | Beall | 501/10 |
| 4,717,695 | 1/1988 | Oda | 501/143 |
| 4,843,047 | 6/1989 | Oda | 501/143 |

FOREIGN PATENT DOCUMENTS

| | | |
|---|---|---|
| 1596782 | 12/1970 | Germany . |
| 2509311 | 10/1975 | Germany . |
| 50-6608 | 1/1975 | Japan . |
| 480275 | 10/1969 | Switzerland . |
| 1177248 | 1/1970 | United Kingdom . |

OTHER PUBLICATIONS

O'Bannon, Dictionary of Ceramic Science and Engineering, 1983, p. 86, no month.
Dodd, Dictionary of Ceramics, 1964, p. 87, no month.
Kingery et al, "Introduction to Ceramic", 1976, pp. 106–107, no month.
W. Vogel, "Chemistry of Glass", The American Ceramic Society, 1985, no month.

Primary Examiner—Mark L. Bell
Assistant Examiner—Deborah Jones
Attorney, Agent, or Firm—Cushman, Darby & Cushman

[57] ABSTRACT

A vitreous china comprises, as principal components, 25 to 70% by weight of a glass phase and 75 to 30% by weight of a crystalline phase, the glass phase comprising, as principal chemical components, 4 to 12% by weight of $K_2O+Na_2O$, 50 to 75% by weight of $SiO_2$ and 17 to 40% by weight of $Al_2O_3$ while the total amount of the glass phase is defined to be 100% by weight, and the crystalline phase comprising, as principal mineral components, 10 to 60% by weight of $\alpha$-alumina, 0 to 20% by weight of quartz and 2 to 20% by weight of mullite while the total amount of the vitreous china is defined to be 100% by weight. The vitreous china and the method for preparing the same may permit the marked improvement of the mechanical strength of the vitreous china. The mechanical strength may be improved without adversely affecting other physical properties (such as high temperature deformation, resistance to thermal shock and firing temperature). This vitreous china can be applied to sanitarywares, large-sized pottery plates and various kinds of engineering ceramics. Moreover, the present invention provides a glaze which has excellent compatibility with vitreous china having high alumina contents and which is thus applied to a large-sized product formed from vitreous china having such a high alumina content.

6 Claims, No Drawings

VITREOUS CHINA, METHOD FOR PREPARING THE VITREOUS CHINA, SANITARY-WARE PRODUCED THEREFROM AND GLAZE THEREFOR

BACKGROUND OF THE INVENTION

The present invention relates to a vitreous china, a method for the preparation of the vitreous china, a sanitary-ware produced from the vitreous china and a glaze for the vitreous china.

The term "vitreous china" means a material which has a compact and uniform structure and which is fired till almost or substantially all of the open cells disappear and the term "vitrification" means the phenomenon that particles constituting the basis material are melted into a glass phase during firing and the glass phase is fluidized at a high temperature to thus fill up the gaps formed between the unmelted particles.

Whether a particular particle can be melted or not is dependent upon the melting point thereof which is influenced by the crystalline structure of the particle, combinations of the particular particle with other particles (a specific crystal which has a high melting point in itself may be melted at a temperature lower than the melting point thereof if other crystals coexist) and the firing temperature and time. In case of conventional vitreous china, raw materials capable of being melted during the vitrification phenomenon are, for instance, feldspars serving as fluxes end clays capable of imparting plasticity during molding, while raw materials which are not melted during the vitrification phenomenon are, for instance, quartz. However, quartz is not completely unmelted. More specifically, a part thereof is melted into the glass phase while the remaining part thereof holds its crystalline form.

Such a vitreous china has presently been used for the production of, for instance, sanitary-wares. Among the ceramic whiteware products, the sanitary-wares have relatively large sizes and complicated shapes and accordingly, have thick-walled structures for ensuring the mechanical strength thereof. The conventional vitreous china has a flexural strength ranging from 400 to 800 $kgf/cm^2$ and products having such a flexural strength requires the wall thickness on the order of 7 to 12 mm.

The reason why quartz has been used as a crystalline phase-forming substance in the conventional vitreous china described above is that it is cheaper than other sources for the crystalline phase and that it is a naturally occurring raw material which coexists with glass phase-forming minerals. For instance, feldspars serving as fluxes and clays capable of imparting plasticity to the basis material during molding rarely independently occur naturally and in most cases, they occur in the form of admixtures with quartz. In addition, there has been known pottery stones which comprise all of these quartz, feldspars and clays and some of them per se can be used alone as a raw material for ceramic whitewares.

For this reason, minerals conventionally used as the crystalline phase-forming raw materials for ceramic whitewares are limited to quartz or cristobalite which is a crystal formed through transformation of quartz at a high temperature. As has been discussed above, however, a part of quartz is melted into the glass phase. Thus, it is very difficult to control the particle size of the quartz present in the resulting fired product and quartz used is often completely melted into the glass phase, in particular, when quartz as a starting material is used in the form of fine particles.

In the field of porcelain, there has recently been conducted studies to substitute other crystals for quartz for eliminating the limit in the particle size distribution encountered when such quartz is used as a crystalline phase and for eliminating the drawbacks originated from the difference between the thermal expansion coefficients of the glass phase and quartz (among various kinds of crystals, quartz is assigned to a group comprising crystals having very high thermal expansion coefficients). They are called, for instance, "alumina porcelain" in which alumina is substituted for quartz in the usual porcelain and "zircon porcelain" in which zircon is substituted for quartz in the usual porcelain, in distinction from the usual quartz-clay-feldspar porcelain. In this respect, the alumina porcelain is developed for mainly improving the strength of the porcelain, while the zircon porcelain is developed for mainly improving the electrical properties of the porcelain. The alumina porcelain has already been practically used in tablewares and insulators and examples thereof are disclosed in, for instance, Japanese Un-examined Patent Publication (hereinafter referred to as "J.P. KOKAI") No. Sho 50-6608.

As has been discussed above, the sanitary-ware formed from a vitreous china has a thick-walled structure because of its low strength. Incidentally, consumers have recently requested high-grade articles and, as a result, there has been a great demand for a sanitary-ware having a sharp shape (such as those having sharp-edged corners). However, thick-walled products cannot respond to this requirement. Moreover, the sanitary-ware in general has a large size and is installed within a narrow space. Therefore, the thick-walled product is heavy and this makes the installation thereof difficult.

In addition, the vitreous china which has been used in the production of sanitary-wares has low strength and thus cannot be used for producing other articles such as various kinds of engineering ceramics and large-sized ceramic plates.

Many attempts have been made, to eliminate the foregoing drawbacks, by substituting other crystalline substances as crystal phase-forming raw materials such as alumina for quartz as in case of porcelain, but such substitution is insufficient in case of vitreous china and suffers from various related problems to be solved.

For instance, high resistance to thermal shock is required for large-sized articles having complicated shapes such as sanitary-wares. The term "thermal shock" herein used includes that encountered during firing and that applied to articles after firing.

An article is liable to receive the thermal shock during firing in particular in the temperature-dropping stage of the process for firing the article in a furnace. More specifically, the temperature of the surface area of the article is lowered while that of the inner part of the article is still high during the temperature-dropping stage and this results in a temperature difference and hence the thermal shock of this kind. On the other hand, an article receives the thermal shock after firing, for instance, when hot water is poured into the article such as a wash-bowl.

Articles other than sanitary-wares such as tablewares of porcelain seem to also receive the thermal shock of this kind (tablewares are likewise subjected to temperature-dropping stage in a furnace during production and sometimes receive hot cooked foods), but this problem becomes more and more serious for large-sized, thick-walled articles having complicated shapes such as sanitary-wares. In other words, a large temperature difference is established between portions of a large-sized thick-walled article and this becomes a cause of thermal shock which results in a breakage of the article. A thick-walled article has resistance to breakage due to a difference in thermal expansion coefficients or a temperature difference weaker than that observed on a thin-walled article even if it is assumed that these thick-walled and thin-walled articles have the same temperature difference between the surface and the back face. Moreover, articles such as sanitary-wares comprise hollow portions therein and the air present in the hollow portions is not easily cooled. This results in application of substantially high thermal shock to the article during the temperature-dropping stage in a furnace.

Furthermore, the vitreous china comprises relatively coarse particles as compared with a porcelain and accordingly, is in general fired at a low temperature. For this reason, if other crystals having high melting points such as alumina are substituted for quartz having a low melting point, the particle size and composition of each raw material must be in accord with those of alumina.

In a slip casting method used as a means for molding, for instance, sanitary-wares, the properties of the slurry used for the molding must be controlled so as to make them favorable for the slip casting and this in turn requires strict control of the particle size and composition of each raw material and strict management of the method for producing a slurry.

Moreover, the surface of the sanitary-ware must be coated with a glaze and accordingly, the glaze must be well-compatible with the properties of the body made of vitreous china. This problem of compatibility is particularly important for large-sized articles having complicated shapes such as sanitary-wares because of a strong force acting on the interface between the body and the glaze.

As has been discussed above, there has not yet been developed any method for improving the strength of the vitreous china without accompanying various problems concerning production techniques and required properties of articles.

SUMMARY OF THE INVENTION

Accordingly, an object of the present invention is to provide a vitreous china which has a low degree of deformation on heating, a wide range of calcination temperature, excellent resistance to thermal shock and high mechanical strength.

Another object of the present invention is to provide a vitreous china which is suitable for use in the production of, for instance, sanitary-wares, large-sized ceramic plates and various kinds of engineering ceramics.

A further object of the present invention is to provide a method for producing the foregoing vitreous china.

A still further object of the present invention is to provide a sanitary-ware produced from the foregoing vitreous china.

It is also an object of the present invention to provide a glaze used for coating the foregoing vitreous china.

According to an aspect of the present invention, there is provided a vitreous china which comprises, as principal components, 25 to 70% by weight of a glass phase and 75 to 30% by weight of a crystalline phase, the glass phase comprising, as principal chemical components, 4 to 12% by weight of $K_2O+Na_2O$, 50 to 75% by weight of $SiO_2$ and 17 to 40% by weight of $Al_2O_3$ while the total amount of the glass phase is defined to be 100% by weight, and the crystalline phase comprising, as principal mineral components, 10 to 60% by weight of $\alpha$-alumina, 0 to 20% by weight of quartz and 2 to 20% by weight of mullite while the total amount of the vitreous china is defined to be 100% by weight.

According to the present invention, there is further provided a sanitary-ware made of the above vitreous china.

Such a vitreous china can be prepared by a method comprising the steps of molding a raw material which comprises 20 to 65% by weight of clays, 4 to 35% by weight of feldspars, 10 to 60% by weight of $\alpha$-alumina and 1 to 40% by weight of quartz, drying the molded body and then firing it.

According to the present invention, there is further provided a method for producing sanitary-ware comprising the steps of molding a raw material which comprises 20 to 65% by weight of clays, 4 to 35% by weight of feldspars, 10 to 60% by weight of $\alpha$-alumina and 1 to 40% by weight of quartz, drying the molded body and then firing it.

According to the present invention, there is further provided a sanitary-ware made of the foregoing vitreous china coated with a Bristol glaze in which wollastonite is substituted for at least 5% of the total calcium source of the glaze or a Bristol glaze comprising frit as a substitute for 1 to 20% by weight of a raw glaze; and a Bristol glaze for coating the vitreous china comprising 10 to 60% by weight of $\alpha$-alumina, which comprises (1) wallastonite as a substitute for at least 5% of the total calcium source of the glaze or (2) frit in an amount ranging from 1 to 20% by weight on the basis of the total weight of a raw glaze.

DESCRIPTION OF THE PREFERRED EMBODIMENTS

The present invention will hereinafter be described in more detail.

The following principal raw materials for the vitreous china can herein be used. Examples of clays include clay minerals such as kaolinite, halloysite, metahalloysite, dickite and pyrophyllite and clayey mica such as illite and sericite. These minerals are abundantly included in clayey raw materials such as Gairome clay, Kibushi clay, kaolin, ball clay and china clay and various kinds of pottery stones and are partly included in feldspathic raw materials. Among these clay minerals, kaolinite and halloysite are particularly effective for enhancing the plasticity of the raw material during molding and sericite shows an excellent effect of lowering the firing temperature of the material. These clay minerals are melted during firing to form a glass phase, but a small part thereof may remain unmelted and may be present in the crystalline form.

Examples of feldspars include feldspathic minerals such as potash feldspar, soda feldspar and anorthite; nephelite and natural glasses and frits.

These feldspathic minerals are abundantly included in, for instance, various kinds of feldspathic raw materials, nepheline syenite, cornish stone, saba, glassy volcanic rock and various kinds of pottery stones and these feldspathic minerals also constitute a part of clayey raw materials. Among these feldspars, particularly preferred are those abundantly containing $K_2O$ and $Na_2O$ as alkaline components and preferred examples thereof are potash feldspar, soda feldspar and nephelite. In addition, if it is desirable to reduce the amount of quartz in the raw material as low as possible, preferably used is nepheline syenite which has a composition substantially free of quartz. These feldspathic minerals are melted during firing to form a glass phase, but a small part thereof may remain unmelted and may hold its crystalline state.

The purity of α-alumina used in the invention is not particularly important and it is generally sufficient to use average soda alumina. Among the physical properties required for α-alumina used herein, the particle size distribution is the most important factor and the average particle size thereof present in a fired material preferably ranges from 0.3 to 50μ and more preferably 1 to 10μ. In respect of the average particle size of alumina, if it is too great, the resulting material has a tendency to decrease its strength, while if it is excessively small, the dispersibility of alumina particles is greatly impaired. This accordingly leads to partial aggregation of these alumina particles and in turn leads to reduction of the strength. In principle, α-alumina should also be melted into a glass phase during firing. According to the experiments performed by the inventors of this invention, however, the results of quantity analysis of the vitreous china to check for the presence of α-alumina performed before and after firing are approximately identical to one another. In addition, the particle size of α-alumina present in the fired material is also observed by an electron microscope and found to be almost identical to that observed on α-alumina used as a raw material. For this reason, the particle size thereof during molding preferably ranges from 0.3 to 50μ and more preferably 1 to 10μ. In this respect, the use of a mixture comprising a plurality of raw materials of different grades having different average particle sizes as sources of α-alumina is effective for the improvement of the dispersibility thereof, in particular when the content of α-alumina is high. On the other hand, if the content thereof is low, the addition of coarse α-alumina particles should be avoided. It is thus preferred to use α-alumina particles having uniform particle size.

Quartz sources may be those completely comprising quartz such as quartz sand and silica stone or may be various pottery stones, saba, feldspathic raw materials and clayey raw materials since they also contain quartz. In respect of quartz, the particle size distribution is very important like alumina, but care must be taken since a part of quartz is melted into the glass phase during calcination unlike alumina.

The inventors of this invention examined the electron micrograph to determine the average particle size of the quartz particles present in the vitreous china of the present invention. As a result, preferred average particle size of quartz was found to be not more than 50μ and more preferably not more than 25μ. In this respect, the reason why any lower limit of the preferred particle size range for quartz is not defined will be apparent from the fact that quartz may be almost completely melted into the glass phase.

The particle size of quartz present in the fired material is strongly correlated to the strength thereof. More specifically, the presence of a small amount of coarse quartz particles adversely affects the strength, but improves the resistance to thermal shock. The quality of the vitreous china is thus changed due to the presence of a small amount of quartz. This is because microcracks seem to be formed at the interface between the quartz phase and the glass phase due to the difference between the thermal expansion coefficients of these two phases and the presence of these microcracks seems to result in a decrease of the strength and to simultaneously play an important role in obstructing the propagation of cracks due to thermal shock. The presence of coarse quartz particles is not preferred from the viewpoint of the strength of the vitreous china, but the structure in which coarse quartz particles (the use of quartz particles having a particle size of greater than 50μ is not preferred) are dispersed in a small amount is preferred for articles which must have high resistance to thermal shock.

The particle size of quartz present in the starting material should be controlled in order to ensure the presence of quartz particles having a preferred particle size in the fired material. The relation between the particle sizes of quartz in the starting material and quartz in the fired material is determined by the firing temperature and time as well as the composition of the glass phase.

In the vitreous china of the invention, quartz particles preferably having, at the time of molding, a particle size ranging from 5 to 65μ are used for controlling the average particle size of quartz particles in the resulting fired material to not more than 50μ. In addition, quartz particles preferably having, at the time of molding, a particle size ranging from 5 to 40μ are used for controlling the average particle size of quartz particles in the resulting fired material to not more than 25μ.

When molding the vitreous china, the particle sizes of α-alumina and quartz preferably fall within the ranges defined above respectively. Methods for controlling the particle sizes thereof at the time of molding will be discussed below. It is sufficient to use α-alumina and quartz each having the corresponding particle size range defined above as powdery raw materials when the process for the production of a raw material does not comprise any pulverization step or when the process comprises a pulverization step, but does not comprise a pulverization step for α-alumina and quartz and they are post-added to the pulverized raw material. Thus, any trouble does not arise in this case. Troubles arise when the process for the production of a raw material comprises a pulverization step. It is impossible to precisely determine the particle size of quartz during molding, in particular when quartz is, for instance, prepared from pottery stones. In such case, the overall particle size of the whole raw material during molding should be controlled and it preferably ranges from 1 to 15μ, more preferably 2 to 10μ.

Principal components which constitute the crystalline phase of the vitreous china of the invention include, for instance, mullite in addition to alumina and quartz. The mullite is a crystal separated from the glass phase and accordingly, mullite need not be used as a raw material. Moreover, a small part of the crystals which are principally melted may remain unmelted, a part of quartz may be converted into cristobalite through transformation or a small amount of crystals such as wollastonite and leucite may be separated.

The vitreous china of the invention comprises a glass phase and a crystalline phase and preferably comprises 25 to 70% by weight of the glass phase and 75 to 30% by weight of the crystalline phase and more preferably 35 to 60% by weight of the glass phase and 65 to 40% by weight of the crystalline phase. If the amount of the glass phase exceeds the upper limit of the foregoing preferred range, the strength of the resulting fired material is lowered and the degree of high temperature deformation during firing become too large, while if the amount of the crystalline phase exceeds the upper limit of the foregoing preferred range, an extremely high temperature is required for the firing of the material and the use of such a high firing temperature makes the industrial production of these materials unfavorable.

A preferred glass phase of the vitreous china of the invention mainly comprises 50 to 75% by weight of $SiO_2$, 17 to 40% by weight of $Al_2O_3$ and 4 to 12% by weight of $K_2O+Na_2O$ while the total amount of the glass phase is defined to be 100% by weight. If the amount of $K_2O+Na_2O$ exceeds the upper limit of the foregoing preferred range, the strength of the resulting fired material is reduced and the degree of the high temperature deformation of the vitreous china during firing is markedly increased, while if it is less than the lower limit, the vitreous china cannot satisfactorily be sintered. On the other hand, if the amount of $K_2O+Na_2O$ falls within the foregoing preferred range (or the amount of $SiO_2+Al_2O_3$ falls within the preferred range defined above) and the amount of $SiO_2$ exceeds the upper limit of the preferred range, the plasticity of the resulting material during molding is lowered and if the amount of $Al_2O_3$ exceeds the upper limit of the preferred range, an extremely high temperature is required for the firing of the material and the use of such a high firing temperature makes the industrial production of these vitreous china unfavorable.

If the amount of $K_2O+Na_2O$ falls within the foregoing preferred range, the relative amounts of $K_2O$ and $Na_2O$ are not restricted to particular ranges, respectively and the amounts thereof should rather be determined on the basis of the overall physical properties of a raw material containing $K_2O$ or $Na_2O$. For instance, if a pottery stone having a high content of sericite is used, the resulting basis material is rich in $K_2O$ and the plasticity of the basis material is improved, while if nepheline syenite is used as a feldspathic component to reduce the content of quartz in the material as low as possible, the resulting material is abundant in $Na_2O$.

A preferred crystalline phase of the vitreous china of the invention mainly comprises 10 to 60% by weight of α-alumina, 0 to 20% by weight of quartz and 2 to 20% by weight of mullite while the total amount of the vitreous china is defined to be 100% by weight. This is because if the amount of α-alumina exceeds the upper limit of the preferred range defined above, an extremely high temperature is required for the firing of the material and the use of such a high firing temperature makes the industrial production of these materials unfavorable, while if it is less than the lower limit of the range, the strength of the fired material is impaired. If the amount of quartz exceeds the upper limit of the preferred range defined above, the strength of the fired material is impaired. In this respect, quartz may completely be melted into the glass phase and accordingly, the lower limit of quartz is defined to be zero. The vitreous china having such a small quartz content is slightly inferior in the resistance to thermal shock and the applications thereof are limited to small-sized products which would not receive the action of thermal shock. Regarding the content of mullite, it is separated from the glass phase in an amount ranging from 2 to 20% by weight if the vitreous china is prepared in accordance with the production conditions discussed above.

A preferred raw material having excellent properties during preparation to produce a vitreous china having the foregoing composition mainly comprises 20 to 65% by weight of clays, 4 to 35% by weight of feldspars, 10 to 60% by weight of α-alumina and 1 to 40% by weight of quartz. The glass phase is principally formed from the clays and feldspars. However, if the content of clays is too high, an extremely high temperature is required for the firing of the vitreous china and this makes the industrial production of these vitreous china unfavorable, while if the content of feldspars is too high, the plasticity during molding is impaired. If the plasticity of the material during molding is particularly important, clay mica such as sericite can preferably be used instead of a part of the clays to thus increase the content of clays and decrease that of feldspars. Regarding the content of α-alumina, the content thereof in the raw material is approximately identical to that in the fired material since it is hardly melted into the glass phase during firing. On the other hand, the content of quartz in the raw basis material preferably ranges from 1 to 40% by weight while taking into consideration the fact that it is melted into the glass phase during firing. Since raw mineral substances such as clays and feldspars contain quartz, it is difficult to reduce the lower limit of the quartz content in the raw basis material to less than 1% by weight even when it is desirable to reduce the content thereof as low as possible.

The lowest possible firing temperature permits economical production of the vitreous china. To reduce the firing temperature of the vitreous china of the invention, it is preferred to incorporate, into the material, at least one member selected from the group consisting of MgO, CaO, BaO and $Li_2O$ as a chemical component of the glass phase in an amount of up to 6% by weight while the total amount of the glass phase is defined to be 100% by weight. Examples of mineral raw materials containing these components are dolomite, talc, wollastonite, petalite, lime, anorthite, magnesite and barium carbonate, with dolomite being particularly preferred for the reduction of the firing temperature.

The addition of these mineral raw materials to the material leads to a decrease of firing temperature and an increase in the degree of high temperature deformation. A low firing temperature is always preferred for industrial production of the vitreous china, but whether such a high degree of deformation on heating is preferred or not varies depending on the applications of the resulting products. For instance, if the products are used as large-sized ceramic plates or large-sized plate-like structural materials, a problem of "warp" during firing arises, but the use of a material having a high degree of deformation on heating in such case ensures good adhesion of the material to a refractory slab during firing and thus can minimize or inhibit the occurrence of the "warp" phenomenon. On the contrary, the deformation during firing becomes a serious problem in case of large-sized products having complicated shapes such as sanitary-wares. This problem of deformation would be a major obstacle in particular when the strength of the material is increased to obtain thin-walled products. Thus, these products preferably has a degree of high temperature deformation as low as possible and accordingly, it is not preferred to add a large amount of MgO, CaO, BaO and/or $Li_2O$ to the glass phase for the purpose of reducing the firing temperature.

Methods for molding the vitreous china of the invention are not limited to specific ones and include, for instance, slip casting, extrusion, jiggering and pressing, but slip casting is in general used for molding large-sized products having complicated shapes such as sanitary-wares. If powdery raw materials each having preferred particle size distribution are commercially available, a slurry (a dispersion of a powdery material in water) for slip casting can be prepared simply by mixing and stirring these powdery raw material. This method is the simplest method since the particle size distribution of each component can independently be controlled.

On the other hand, if powdery raw materials each having preferred particle size distribution are not commercially available (for instance massive pottery stone is used as a raw material), the preparation of the slurry requires the use of a step for pulverizing a raw material using, for instance, a ball mill. In this case, the preparation process can be simplified by pulverizing the whole raw materials in one lot, but sometimes the slurry is preferably prepared by pulverizing the raw material except for some components and adding these some components to the pulverized material after the pulverization step.

For instance, $\alpha$-alumina is usually the hardest powdery material among the raw materials and accordingly, the particle size distribution thereof is only slightly changed if the pulverization is performed for a short time period. Therefore, the particle size distribution of $\alpha$-alumina is almost independent of whether it is added to other raw materials before or after the pulverization thereof. However, the resulting fired material has sometimes excellent resistance to thermal shock if a part or whole of $\alpha$-alumina is added subsequent to the pulverization, possibly because of changes in the surface properties of $\alpha$-alumina through the pulverization. But if $\alpha$-alumina is not pulverized, it is sometimes in the aggregated state and is insufficiently dispersed in the raw material depending on the grades thereof used. In such case, the aggregated $\alpha$-alumina particles can be dispersed without severely changing the surface properties thereof by adding $\alpha$-alumina into other raw materials after completion of the pulverization step and then pulverizing the mixture for, for instance, about 30 minutes.

In addition, the particle size distribution of quartz is also important. Therefore, quartz can be post-added to the pulverized other raw materials to ensure highly precise control of the particle size distribution. Moreover, if quartz is not pulverized, it is sometimes in the aggregated state as in the case of $\alpha$-alumina and is insufficiently dispersed in the raw material depending on the grades thereof used. In such case, the aggregated quartz particles can be dispersed without changing the particle size distribution by adding quartz into other raw materials after completion of the pulverization step and then pulverizing the mixture for, for instance, about 30 minutes.

In the preparation of the slurry for slip casting, a deflocculant must be added to the slurry to improve the dispersibility of the particles of the raw materials and examples of such deflocculants usable herein include conventionally known ones such as water glass, sodium carbonate, sodium humate, quebracho, sodium polyacrylate and ammonium salts of acrylic acid oligomers.

If the strength of the molded product is particularly important, a binder may be added to the slurry for the improvement of the strength thereof and may be any conventionally known ones such as sodium carboxymethyl cellulose, polyvinyl alcohol, dextrin, gum arabic, tragacanth gum, methyl cellulose, peptone, soluble starch, various kinds of emulsion binders and colloidal silica.

Moreover, the slurry may also comprise other additives such as lubricants, releasing agents, plasticizers and/or antifoaming agents.

The temperature for firing the vitreous china of the invention may be determined depending on the properties required for individual applications of articles. A firing degree of vitreous china is usually rated by the ink-permeability or water absorption percentage of the material. For instance, the ink-permeability of the vitreous china for sanitary-wares is defined to be not more than 3 mm in accordance with JIS standard and the water absorption percentage thereof is defined to be not more than 0.5% in accordance with the ANSI standard. Usually the higher the firing temperature, the lower the water absorption percentage of the material, but if the firing temperature is too high, the higher the firing temperature, the higher the water absorption percentage, due to foaming of, for instance, feldspars. In addition, the strength of the material is in general increased as the water absorption percentage decreases. In this connection, the conventional vitreous china having a high water absorption percentage has a tendency to exhibit very low strength and the strength thereof shows an abrupt increase at an instance when the water absorption percentage reaches 1 to 0.5%. On the other hand, the vitreous china of the invention holds substantially high strength even when the water absorption percentage is high to a certain extent and such material is suitably used for the production of articles which may have a high water absorption percentage.

If the vitreous china of the present invention is used for producing a sanitary-ware such as a toilet bowl, a wash-bowl, a washhand bowl, a sink, a bathtub, a tank and accessories, a glaze should be applied to the surface of the vitreous china. The Bristol glaze has usually been employed as a glaze for sanitary-ware. The Bristol glaze mainly comprises $RO_2$ (acidic oxides mainly comprising $SiO_2$), $R_2O_3$ (amphoteric oxide mainly comprising $Al_2O_3$), $R_2O+RO$ (basic oxide mainly comprising $K_2O$, $Na_2O$, $CaO$, $ZnO$, $MgO$, $BaO$ and/or $SrO$) and an optional opacifier (such as zircon and tin oxide) and various kinds of stains.

The firing temperature of the vitreous china varies depending on the mixing ratio of raw materials and it has been known that the rate of the foregoing oxides of glaze is adjusted in line with the firing temperature (for instance, the amount of $R_2O_3$ is increased as the firing temperature increases, while the amount of $R_2O+RO$ is increased as the temperature decreases). These oxides are melted during firing to form a glass phase and accordingly, various physical properties of the glaze after the completion of firing are almost determined simply by the contents of these oxides and are hardly affected by the kinds of mineral raw materials containing these oxides.

However, if a conventional Bristol glaze is used for coating the vitreous china of the invention, a problem of so-called "crawling" sometimes arises. This tendency becomes more and more conspicuous as the amount of $\alpha$-alumina included in the basic material increases. This phenomenon is mainly caused due to the difference between the thermal expansion coefficients of the glaze and the vitreous china during the temperature-raising step. In this respect, the thermal expansion behavior of the vitreous china of the invention which comprises α-alumina differs from that of the conventional vitreous china.

One of preferred means for eliminating the foregoing drawback and for controlling the thermal expansion behavior of the glaze during temperature-raising step so as to coincide with that of the vitreous china of the invention is to substitute wollastonite for at least 5% of the whole CaO source present in the glaze.

In the conventional Bristol glaze, the CaO source is usually lime represented by the chemical formula: $CaCO_3$. This is because lime is the cheapest and most abundant Ca source and its handling is very easy. When wollastonite is substituted for lime, the rate of substitution is increased as the content of α-alumina in the vitreous china to be coated with the glaze increases. It should be noted that wollastonite contains $SiO_2$ as will be apparent from its chemical formula: $CaO \cdot SiO_2$. Therefore, the amount of $SiO_2$ present in other raw materials of the glaze must be reduced in proportion to that included in wollastonite added as a component of the glaze. In this respect, the usual Bristol glaze comprises a large amount of quartz sand as an $SiO_2$ source and accordingly, it is sufficient to adjust the amount of quartz sand to be added to the glaze.

Moreover, another preferred means for eliminating the foregoing drawback and for controlling the thermal expansion behavior of the glaze during temperature-raising step so as to coincide with that of the vitreous china of the invention is to use a glaze, 1 to 20% by weight of which is present in the form of frits. The rate of frit in the glaze is increased as the content of α-alumina in the vitreous china to be coated with the glaze increases.

The frit used may be those having any chemical composition, but those mainly comprising $SiO_2$, $Al_2O_3$, several kinds of basic oxides and optionally $B_2O_3$ are easily available.

The means for controlling the thermal expansion behavior of the glaze during temperature-raising step in a furnace so as to coincide with that of the vitreous china has been discussed above. In addition, it is also necessary to control the thermal expansion behavior of the glaze during temperature-dropping step in a furnace so as to coincide with that of the vitreous china. Such a technique has been known as a relation between the thermal expansion coefficients of the fired vitreous china and the glaze and the thermal expansion coefficient of the vitreous china must in general be slightly higher than that of the glaze since a compressive stress is applied to the glaze layer. The thermal expansion coefficient of α-alumina is substantially lower than that of quartz. Therefore, if the content of α-alumina in the vitreous china is extremely high, the conventional glaze per se cannot be used and the mixing ratio of oxides in the glaze must be modified to reduce the thermal expansion coefficient of the glaze. One of the means therefor is to increase the content of acidic oxides and to decrease the content of basic oxides. This method makes the melting temperature of the glaze high, but any particular problem does not arise, since the higher the content of α-alumina in the vitreous china, the higher the sintering temperature of the vitreous china.

The present invention will hereinafter be explained in more detail with reference to the following non-limitative working Examples and the effects practically achieved by the invention will also be discussed in detail in comparison to Comparative Examples.

EXAMPLES 1 TO 32 AND COMPARATIVE EXAMPLES 1 TO 4

Various vitreous china of the present invention (the compositions thereof are detailed in the following Table 1) and Comparative Examples were prepared in the manner detailed above.

Table 1 shows physical properties of vitreous china of the invention and the method for preparing the vitreous china and Table 2 shows physical properties of the conventional vitreous china in which the crystalline phase simply comprises quartz and mullite.

TABLE 1

| Ex. No. | 1 | 2 | 3 | 4 | 5 | 6 | 7 | 8 |
|---|---|---|---|---|---|---|---|---|
| Glass Phase[1] (wt %) | 38 | 45 | 48 | 50 | 49 | 50 | 52 | 56 |
| Cryst. Phase[2] (wt %) | 62 | 55 | 52 | 50 | 51 | 50 | 48 | 44 |
| Components of Glass Phase[3] (wt %) | | | | | | | | |
| $SiO_2$ | 61.2 | 61.6 | 62.7 | 62.3 | 63.8 | 63.9 | 64.7 | 67.9 |
| $TiO_2$ | 0.4 | 0.4 | 0.5 | 0.5 | 0.5 | 0.6 | 0.7 | 0.6 |
| $Al_2O_3$ | 27.5 | 28.3 | 28.0 | 27.2 | 27.1 | 25.2 | 25.4 | 23.7 |
| $Fe_2O_3$ | 0.6 | 0.6 | 0.7 | 0.8 | 0.8 | 0.9 | 1.1 | 0.9 |
| $K_2O$ | 4.2 | 3.7 | 3.2 | 3.7 | 3.0 | 3.7 | 3.0 | 2.7 |
| $Na_2O$ | 5.5 | 4.8 | 4.4 | 4.8 | 4.4 | 5.1 | 4.5 | 3.6 |
| MgO | 0.3 | 0.3 | 0.3 | 0.4 | 0.3 | 0.3 | 0.3 | 0.3 |
| CaO | 0.3 | 0.3 | 0.2 | 0.3 | 0.2 | 0.3 | 0.3 | 0.3 |
| BaO | — | — | — | — | — | — | — | — |
| $Li_2O$ | — | — | — | — | — | — | — | — |
| Main Components of Cryst. Phase[4] (wt. %) | | | | | | | | |
| α-alumina | 59 | 50 | 44 | 43 | 41 | 40 | 35 | 26 |
| quartz | tr | tr | tr | tr | tr | tr | tr | 8 |
| mullite | 3 | 5 | 8 | 7 | 10 | 10 | 13 | 10 |
| Average Particle Size of Crystalline Phase[5] (wt %) | | | | | | | | |
| α-alumina | 4 | 4.5 | 5 | 5 | 5 | 5 | 5 | 5 |
| quartz | — | — | — | — | — | — | — | 7 |
| Ex. No. | 1 | 2 | 3 | 4 | 5 | 6 | 7 | 8 |
| B.S.[6] (kgf/cm$^2$) | 2050 | 2020 | 2210 | 2230 | 2180 | 2150 | 2100 | 1910 |
| Y.M.[6] (kgf/mm$^2$) | 8900 | 8900 | 9200 | 9200 | 9300 | 9000 | 8900 | 8200 |
| Deg. of H.T.D.[7] (mm) | 27 | 25 | 20 | 24 | 20 | 20 | 17 | 11 |
| W.A.P.[8] (%) | 0.98 | 0.38 | 0.08 | 0.06 | 0.07 | 0.07 | 0.09 | 0.05 |
| Rest. to T.S.[9] (°C.) | 90 | 100 | 100 | 90 | 100 | 100 | 100 | 150 |
| Composition of raw materials of vitreous china (wt %) | | | | | | | | |
| alumina A[10] | | | | | | | | |

TABLE 1-continued alumina B[11]
alumina C[12]
alumina D[13]
alumina E[14]
quartz sand A[15]
quartz sand B[16]
quartz sand C[17]
quartz sand D[18]
quartz sand E[19]
pottery stone A[20]
pottery stone B[21]
pottery stone C[22]
pottery stone D[23]

B.S.: Bending strength; Y.M.: Young's Modulus; Deg. of H.T.D.:
degree of high temperature deformation; W.A.P.: Water
absorption percentage; Res. to T.S.: Resistance to thermal
shock.

| Ex. No. | 1 | 2 | 3 | 4 | 5 | 6 | 7 | 8 |
|---|---|---|---|---|---|---|---|---|
| alumina C[12] | 43 | 40 | 45 | 45 | 40 | 40 | 35 | 25 |
| alumina D[13] | 10 | 10 | | | | | | |
| alumina E[14] | 5 | | | | | | | |
| quartz sand C[17] | | | | | | | | 5 |
| quartz sand D[18] | | | | | | | | 15 |

| Ex. No. | 1 | 2 | 3 | 4 | 5 | 6 | 7 | 8 |
|---|---|---|---|---|---|---|---|---|
| Composition of raw materials of vitreous china (wt %) | | | | | | | | |
| feldspar A[24] | | | | | | | | |
| feldspar B[25] | | | | | | | | |
| feldspar C[26] | | | | | | | | |
| feldspar D[27] | | | | | | | | |
| nepheline syenite A[28] | | | | 20 | | 20 | | |
| nepheline syenite B[29] | 20 | 18 | 15 | | 15 | | 15 | 15 |
| pumice[30] | | | | | | | | |
| Gairome clay[31] | | | | | | | | |
| Kibushi clay[32] | | | | | | | | |
| kaolin A[33] | | | | | | | | |
| kaolin B[34] | | | | | | | | |
| ball clay A[35] | 14 | 12 | 5 | 5 | 5 | 5 | 5 | |
| ball clay B[36] | | 6 | 16 | 15 | 18 | 10 | 20 | 20 |
| china clay A[37] | | | 19 | 15 | 22 | 25 | 25 | 20 |
| china clay B[38] | 8 | 14 | | | | | | |
| dolomite[39] | | | | | | | | |
| petalite[40] | | | | | | | | |
| magnesite[41] | | | | | | | | |
| lime[42] | | | | | | | | |

| Ex. No. | 1 | 2 | 3 | 4 | 5 | 6 | 7 | 8 |
|---|---|---|---|---|---|---|---|---|
| Composition of Raw Materials of Vitreous China (wt %) | | | | | | | | |
| talc[43] | | | | | | | | |
| barium carbonate[44] | | | | | | | | |
| Total | 100 | 100 | 100 | 100 | 100 | 100 | 100 | 100 |
| Main Mineral Components of Raw Materials of Vitreous China[45] (wt %) | | | | | | | | |
| clays | 20 | 29 | 36 | 31 | 41 | 37 | 45 | 36 |
| feldspars | 20 | 18 | 15 | 20 | 15 | 20 | 15 | 15 |
| α-alumina | 58 | 50 | 45 | 45 | 40 | 40 | 35 | 25 |
| quartz | 2 | 3 | 4 | 4 | 4 | 3 | 5 | 24 |
| Method for Preparing Slurry[46] | A | A | A | A | A | A | A | C (12) (17) |
| Average Particle Size of Slurry (μ)[47] | 7.3 | 6.8 | 8.0 | 7.6 | 6.8 | 7.2 | 7.7 | 5.4 |
| Firing Temp. (°C.)[48] | 1360 | 1320 | 1320 | 1260 | 1300 | 1240 | 1240 | 1180 |

| Ex. No. | 9 | 10 | 11 | 12 | 13 | 14 | 15 | 16 |
|---|---|---|---|---|---|---|---|---|
| Glass Phase[1] (wt %) | 57 | 56 | 57 | 46 | 45 | 45 | 44 | 46 |
| Cryst. Phase[2] (wt %) | 43 | 44 | 43 | 54 | 55 | 55 | 56 | 54 |
| Components of Glass Phase[3] (wt %) | | | | | | | | |
| $SiO_2$ | 67.8 | 68.2 | 67.7 | 60.9 | 61.3 | 61.9 | 62.2 | 63.4 |
| $TiO_2$ | 0.5 | 0.5 | 0.6 | 0.5 | 0.6 | 0.5 | 0.5 | 0.6 |
| $Al_2O_3$ | 23.9 | 23.6 | 24.0 | 27.3 | 27.5 | 27.7 | 27.9 | 28.3 |
| $Fe_2O_3$ | 0.9 | 0.9 | 0.9 | 0.8 | 0.9 | 0.8 | 0.8 | 0.9 |
| $K_2O$ | 2.7 | 2.7 | 2.6 | 2.1 | 2.4 | 2.8 | 3.0 | 2.5 |
| $Na_2O$ | 3.6 | 3.5 | 3.7 | 2.8 | 3.2 | 3.7 | 4.0 | 3.4 |
| MgO | 0.3 | 0.3 | 0.3 | 2.3 | 1.7 | 1.1 | 0.7 | 0.3 |
| CaO | 0.3 | 0.3 | 0.2 | 3.3 | 2.4 | 1.5 | 0.9 | 0.3 |
| BaO | — | — | — | — | — | — | — | — |
| $Li_2O$ | — | — | — | — | — | — | — | 0.3 |
| Main Components of Cryst. Phase[4] (wt %) | | | | | | | | |
| α-alumina | 25 | 26 | 25 | 48 | 47 | 46 | 46 | 46 |
| quartz | 8 | 7 | 8 | tr | tr | tr | tr | tr |
| mullite | 10 | 11 | 10 | 6 | 8 | 9 | 10 | 8 |
| Average Particle Size of Crystalline Phase[5] (wt %) | | | | | | | | |
| α-alumina | 5 | 5 | 5 | 5 | 5 | 5 | 5 | 5 |

TABLE 1-continued

| Ex. No. | 9 | 10 | 11 | 12 | 13 | 14 | 15 | 16 |
|---|---|---|---|---|---|---|---|---|
| quartz | 6 | 5 | 6 | — | — | — | — | — |

| Ex. No. | 9 | 10 | 11 | 12 | 13 | 14 | 15 | 16 |
|---|---|---|---|---|---|---|---|---|
| B.S.[6] (kgf/cm$^2$) | 1940 | 1970 | 1950 | 2420 | 2950 | 2680 | 2350 | 2480 |
| Y.M.[6] (kgf/mm$^2$) | 8300 | 8400 | 8300 | 9800 | 12100 | 10500 | 9200 | 9800 |
| Deg. of H.T.D.[7] (mm) | 12 | 11 | 12 | 52 | 45 | 33 | 26 | 30 |
| W.A.P.[8] (%) | 0.07 | 0.07 | 0.06 | 0.03 | 0.05 | 0.06 | 0.08 | 0.05 |
| Res. to T.S.[9] (°C.) | 130 | 110 | 120 | 100 | 100 | 100 | 100 | 100 |
| Composition of Raw Materials of Vitreous China (wt %) | | | | | | | | |
| alumina A[10] | | | | | | | | |
| alumina B[11] | | | | | | | | |
| alumina C[12] | 25 | 25 | 25 | 45 | 45 | 45 | 45 | 45 |
| alumina D[13] | | | | | | | | |
| alumina E[14] | | | | | | | | |
| quartz sand A[15] | | | | | | | | |
| quartz sand B[16] | | | | | | | | |
| quartz sand C[17] | 5 | 5 | 5 | | | | | |
| quartz sand D[18] | 15 | 15 | 15 | | | | | |
| quartz sand E[19] | | | | | | | | |
| pottery stone A[20] | | | | | | | | |

B.S.: Bending strength; Y.M.: Young's Modulus; Deg. of H.T.D.: degree of high temperature deformation; W.A.P.: Water absorption percentage; Res. to T.S.: Resistance to thermal shock.

| Ex. No. | 9 | 10 | 11 | 12 | 13 | 14 | 15 | 16 |
|---|---|---|---|---|---|---|---|---|
| Composition of Raw Materials of Vitreous China (wt %) | | | | | | | | |
| pottery stone B[21] | | | | | | | | |
| pottery stone C[22] | | | | | | | | |
| pottery stone D[23] | | | | | | | | |
| feldspar A[24] | | | | | | | | |
| feldspar B[25] | | | | | | | | |
| feldspar C[26] | | | | | | | | |
| feldspar D[27] | | | | | | | | |
| nepheline syenite A[28] | | | | 10 | 11.5 | 13 | 14 | 12 |
| nepheline syenite B[29] | 15 | 15 | 15 | | | | | |
| pumice[30] | | | | | | | | |
| Gairome clay[31] | | | | | | | | |
| Kibushi clay[32] | | | | | | | | |
| kaolin A[33] | | | | | | | | |
| kaolin B[34] | | | | | | | | |
| ball clay A[35] | | | | | 5 | 10 | 20 | 5 |
| ball clay B[36] | 20 | 20 | 20 | 20 | 15 | 10 | | 15 |
| china clay A[37] | 20 | 20 | 20 | 20 | 15 | 10 | | 10 |
| china clay B[38] | | | | | 5 | 10 | 20 | 10 |
| dolomite[39] | | | | 5 | 3.5 | 2 | 1 | |

| Ex. No. | 9 | 10 | 11 | 12 | 13 | 14 | 15 | 16 |
|---|---|---|---|---|---|---|---|---|
| Composition of Raw Materials of Vitreous China (wt %) | | | | | | | | |
| petalite[40] | | | | | | | | 3 |
| magnesite[41] | | | | | | | | |
| lime[42] | | | | | | | | |
| talc[43] | | | | | | | | |
| barium carbonate[44] | | | | | | | | |
| Total | 100 | 100 | 100 | 100 | 100 | 100 | 100 | 100 |
| Main Mineral Components of Raw Materials of Vitreous China[45] (wt %) | | | | | | | | |
| clays | 36 | 36 | 36 | 36 | 36 | 36 | 37 | 36 |
| feldspars | 15 | 15 | 15 | 10 | 11.5 | 13 | 14 | 12 |
| α-alumina | 25 | 25 | 25 | 45 | 45 | 45 | 45 | 45 |
| quartz | 24 | 24 | 24 | 4 | 4 | 4 | 3 | 4 |
| Method for Preparing Slurry[46] | C (17) | B | C (18) | A | A | A | A | A |
| Average Particle Size of Slurry (μ)[47] | 5.5 | 5.8 | 5.5 | 9.0 | 7.8 | 7.2 | 6.8 | 8.1 |
| Firing Temp. (°C.)[48] | 1180 | 1180 | 1180 | 1100 | 1140 | 1200 | 1280 | 1240 |

| Ex. No. | 17 | 18 | 19 | 20 | 21 | 22 | 23 | 24 |
|---|---|---|---|---|---|---|---|---|
| Glass Phase[1] (wt %) | 47 | 45 | 46 | 44 | 63 | 46 | 46 | 47 |
| Cryst. Phase[2] (wt %) | 53 | 55 | 54 | 56 | 37 | 54 | 54 | 53 |
| Components of Glass Phase[3] (wt %) | | | | | | | | |
| SiO$_2$ | 60.3 | 60.6 | 62.0 | 59.9 | 73.9 | 62.9 | 62.5 | 62.7 |
| TiO$_2$ | 0.6 | 0.6 | 0.5 | 0.6 | 0.5 | 0.5 | 0.6 | 0.5 |
| Al$_2$O$_3$ | 28.3 | 27.9 | 28.3 | 27.6 | 19.2 | 27.8 | 27.9 | 28.0 |
| Fe$_2$O$_3$ | 0.9 | 0.8 | 0.9 | 0.9 | 0.8 | 0.7 | 0.8 | 0.7 |
| K$_2$O | 2.5 | 2.5 | 2.5 | 2.6 | 2.2 | 3.2 | 3.3 | 3.1 |
| Na$_2$O | 3.3 | 3.4 | 3.3 | 3.4 | 2.9 | 4.4 | 4.3 | 4.5 |

TABLE 1-continued

| | | | | | | | | |
|---|---|---|---|---|---|---|---|---|
| MgO | 3.8 | 0.3 | 2.1 | 0.4 | 0.3 | 0.3 | 0.3 | 0.3 |
| CaO | 0.3 | 3.9 | 0.4 | 0.3 | 0.2 | 0.2 | 0.3 | 0.2 |
| BaO | — | — | — | 4.3 | — | — | — | — |
| $Li_2O$ | — | — | — | — | — | — | — | — |
| Main Components of Cryst. Phase[4] (wt %) | | | | | | | | |
| $\alpha$-alumina | 46 | 47 | 46 | 47 | 11 | 46 | 45 | 43 |
| quartz | tr | tr | tr | tr | 18 | tr | tr | tr |
| mullite | 7 | 8 | 8 | 9 | 9 | 8 | 9 | 10 |
| Average Particle Size of Crystalline Phase[5] (wt %) | | | | | | | | |
| $\alpha$-alumina | 5 | 5 | 5 | 5 | 40 | 10 | 1.5 | 0.4 |
| quartz | — | — | — | — | 6 | — | — | — |

| Ex. No. | 17 | 18 | 19 | 20 | 21 | 22 | 23 | 24 |
|---|---|---|---|---|---|---|---|---|
| B.S.[6] (kgf/cm²) | 2350 | 2360 | 2380 | 2410 | 1520 | 2030 | 2060 | 1870 |
| Y.M.[6] (kgf/mm²) | 9400 | 9400 | 9600 | 9800 | 6900 | 8900 | 8800 | 8200 |
| Deg. of H.T.D.[7] (mm) | 32 | 28 | 26 | 31 | 19 | 23 | 18 | 14 |
| W.A.P.[8] (%) | 0.04 | 0.07 | 0.08 | 0.03 | 0.21 | 0.09 | 0.06 | 0.07 |
| Res. to T.S.[9] (°C.) | 100 | 90 | 100 | 90 | 120 | 100 | 100 | 100 |
| Composition of Raw Materials of Vitreous China (wt %) | | | | | | | | |
| alumina A[10] | | | | | 10 | | | |
| alumina B[11] | | | | | | 45 | | |
| alumina C[12] | 45 | 45 | 45 | 45 | | | | |
| alumina D[13] | | | | | | | 45 | |
| alumina E[14] | | | | | | | | 45 |
| quartz sand A[15] | | | | | | | | |
| quartz sand B[16] | | | | | | | | |
| quartz sand C[17] | | | | | 15 | | | |
| quartz sand D[18] | | | | | 10 | | | |
| quartz sand E[19] | | | | | 10 | | | |
| pottery stone A[20] | | | | | | | | |
| pottery stone B[21] | | | | | | | | |
| pottery stone C[22] | | | | | | | | |
| pottery stone D[23] | | | | | | | | |

B.S.: Bending strength; Y.M.: Young's Modulus; Deg. of H.T.D.: degree of high temperature deformation; W.A.P.: Water absorption percentage; Res. to T.S.: Resistance to thermal shock.

| Ex. No. | 17 | 18 | 19 | 20 | 21 | 22 | 23 | 24 |
|---|---|---|---|---|---|---|---|---|
| Composition of Raw Materials of Vitreous China (wt %) | | | | | | | | |
| feldspar A[24] | | | | | | | | |
| feldspar B[25] | | | | | | | | |
| feldspar C[26] | | | | | | | | |
| feldspar D[27] | | | | | | | | |
| nepheline syenite A[28] | 12 | 12 | 12 | 12 | | | 15 | 15 |
| nepheline syenite B[29] | | | | | 15 | 15 | | |
| pumice[30] | | | | | | | | |
| Gairome clay[31] | | | | | | | | |
| Kibushi clay[32] | | | | | | | | |
| kaolin A[33] | | | | | | | | |
| kaolin B[34] | | | | | | | | |
| ball clay A[35] | 5 | 5 | 5 | 5 | 20 | 10 | 10 | |
| ball clay B[36] | 15 | 15 | 15 | 15 | | 10 | 10 | 20 |
| china clay A[37] | 10 | 10 | 10 | 10 | | 10 | 10 | 20 |
| china clay B[38] | 10 | 10 | 10 | 10 | 20 | 10 | 10 | |
| dolomite[39] | | | | | | | | |
| petalite[40] | | | | | | | | |
| magnesite[41] | 3 | | | | | | | |
| lime[42] | | 3 | | | | | | |

| Ex. No. | 17 | 18 | 19 | 20 | 21 | 22 | 23 | 24 |
|---|---|---|---|---|---|---|---|---|
| Composition of Raw Materials of Vitreous China (wt %) | | | | | | | | |
| talc[43] | | | 3 | | | | | |
| barium carbonate[44] | | | | 3 | | | | |
| Total | 100 | 100 | 100 | 100 | 100 | 100 | 100 | 100 |
| Main Mineral Components of Raw Materials of Vitreous China[45] (wt %) | | | | | | | | |
| clays | 36 | 36 | 36 | 36 | 36 | 36 | 36 | 36 |
| feldspars | 12 | 12 | 12 | 12 | 15 | 15 | 15 | 15 |
| $\alpha$-alumina | 45 | 45 | 45 | 45 | 10 | 45 | 45 | 45 |
| quartz | 4 | 4 | 4 | 4 | 39 | 4 | 4 | 4 |
| Method for Preparing Slurry[46] | A | A | A | A (16) | C (17) | A | A | A |
| Average Particle Size of Slurry ($\mu$)[47] | 8.3 | 8.2 | 8.5 | 8.1 | 9.3 | 10.0 | 6.4 | 5.4 |
| Firing Temp. (°C.)[48] | 1260 | 1240 | 1260 | 1280 | 1220 | 1340 | 1300 | 1260 |

TABLE 1-continued

| Ex. No. | 25 | 26 | 27 | 28 | 29 | 30 | 31 | 32 |
|---|---|---|---|---|---|---|---|---|
| Glass Phase[1] (wt %) | 51 | 64 | 46 | 46 | 64 | 67 | 32 | 56 |
| Cryst. Phase[2] (wt %) | 49 | 36 | 54 | 54 | 36 | 33 | 68 | 44 |
| Components of Glass Phase[3] (wt %) | | | | | | | | |
| $SiO_2$ | 57.0 | 50.4 | 63.0 | 63.3 | 58.0 | 62.1 | 65.3 | 61.0 |
| $TiO_2$ | 1.0 | 1.1 | 0.5 | 0.5 | 1.1 | 1.0 | 0.6 | 0.7 |
| $Al_2O_3$ | 34.0 | 38.0 | 27.7 | 27.2 | 28.4 | 28.0 | 21.1 | 28.0 |
| $Fe_2O_3$ | 1.2 | 1.2 | 0.8 | 0.8 | 1.1 | 1.2 | 0.7 | 0.9 |
| $K_2O$ | 2.5 | 3.0 | 3.1 | 3.2 | 10.1 | 4.5 | 4.0 | 3.9 |
| $Na_2O$ | 3.5 | 5.1 | 4.4 | 4.4 | 1.1 | 2.6 | 6.6 | 2.0 |
| MgO | 0.4 | 0.6 | 0.3 | 0.3 | 0.1 | 0.3 | 0.8 | 1.4 |
| CaO | 0.4 | 0.6 | 0.2 | 0.3 | 0.1 | 0.3 | 0.9 | 2.1 |
| BaO | — | — | — | — | — | — | — | — |
| $Li_2O$ | — | — | — | — | — | — | — | — |
| Main Components of Cryst. Phase[4] (wt %) | | | | | | | | |
| α-alumina | 31 | 32 | 45 | 44 | 27 | 21 | 59 | 26 |
| quartz | tr | tr | 2 | 1 | 1 | 6 | 1 | 10 |
| mullite | 18 | 4 | 7 | 8 | 6 | 6 | 8 | 8 |
| Average Particle Size of Crystalline Phase[5] (wt %) | | | | | | | | |
| α-alumina | 5 | 0.4 | 5 | 5 | 5 | 5 | 0.4 | 5 |
| quartz | — | — | 45 | 30 | 17 | 15 | 20 | 24 |

| Ex. No. | 25 | 26 | 27 | 28 | 29 | 30 | 31 | 32 |
|---|---|---|---|---|---|---|---|---|
| B.S.[6] (kgf/cm²) | 1850 | 1820 | 1850 | 2050 | 1830 | 1850 | 2030 | 2080 |
| Y.M.[6] (kgf/mm²) | 8200 | 8100 | 8400 | 8800 | 8100 | 8100 | 9800 | 9100 |
| Deg. of H.T.D.[7] (mm) | 17 | 21 | 20 | 19 | 16 | 20 | 16 | 30 |
| W.A.P.[8] (%) | 0.09 | 0.07 | 0.06 | 0.07 | 0.10 | 0.09 | 0.48 | 0.09 |
| Res. to T.S.[9] (°C.) | 100 | 100 | 140 | 130 | 110 | 110 | 100 | 110 |
| Composition of Raw Materials of Vitreous China (wt %) | | | | | | | | |
| alumina A[10] | | | | | | | | |
| alumina B[11] | | | | | | | | |
| alumina C[12] | 28 | | 43 | 43 | 25 | 20 | | 25 |
| alumina D[13] | | | | | | | | |
| alumina E[14] | | 30 | | | | | 58 | |
| quartz sand A[15] | | | 2 | | | | | |
| quartz sand B[16] | | | | 2 | | | | |
| quartz sand C[17] | | | | | | | | |
| quartz sand D[18] | | | | | | | | |
| quartz sand E[19] | | | | | | | | |
| pottery stone A[20] | | | | | | 5 | | 18 |
| pottery stone B[21] | | | | | | 5 | | 10 |
| pottery stone C[22] | | | | | | 65 | | 10 |
| pottery stone D[23] | | | | | | 25 | | |

B.S.: Bending strength; Y.M.: Young's Modulus; Deg. of H.T.D.: degree of high temperature deformation; W.A.P.: Water absorption percentage; Res. to T.S.: Resistance to thermal shock.

| Ex. No. | 25 | 26 | 27 | 28 | 29 | 30 | 31 | 32 |
|---|---|---|---|---|---|---|---|---|
| Composition of Raw Materials of Vitreous China (wt %) | | | | | | | | |
| feldspar A[24] | | | | | | 8 | | |
| feldspar B[25] | | | | | | 10 | | 10 |
| feldspar C[26] | | | | | | 8 | | |
| feldspar D[27] | | | | | | 10 | | 2 |
| nepheline syenite A[28] | 6 | | | | | | | |
| nepheline syenite B[29] | 6 | | 15 | 15 | | | | |
| pumice[30] | | 12 | | | | | 12 | |
| Gairome clay[31] | | | | | | 11 | | 15 |
| Kibushi clay[32] | | | | | | | 5 | |
| kaolin A[33] | | | | | | | 25 | 7 |
| kaolin B[34] | | | | | | 8 | | |
| ball clay A[35] | | | | | | | | |
| ball clay B[36] | 30 | 10 | 10 | 10 | | | | |
| china clay A[37] | 30 | 20 | 10 | 10 | | | | |
| china clay B[38] | | 28 | 20 | 20 | | | | |
| dolomite[39] | | | | | | | | 3 |
| petalite[40] | | | | | | | | |
| magnesite[41] | | | | | | | | |
| lime[42] | | | | | | | | |

| Ex. No. | 25 | 26 | 27 | 28 | 29 | 30 | 31 | 32 |
|---|---|---|---|---|---|---|---|---|
| Composition of Raw Materials of Vitreous China (wt %) | | | | | | | | |
| talc[43] | | | | | | | | |
| barium carbonate[44] | | | | | | | | |
| Total | 100 | 100 | 100 | 100 | 100 | 100 | 100 | 100 |
| Main Mineral Components of Raw Materials of Vitreous China[45] (wt %) | | | | | | | | |

TABLE 1-continued

| | | | | | | | | |
|---|---|---|---|---|---|---|---|---|
| clays | 54 | 52 | 36 | 36 | 62 | 32 | 28 | 47 |
| feldspars | 12 | 11 | 15 | 15 | 5 | 33 | 11 | 13 |
| α-alumina | 28 | 30 | 43 | 43 | 25 | 20 | 58 | 25 |
| quartz | 6 | 7 | 6 | 6 | 8 | 15 | 3 | 15 |
| Method for Preparing Slurry[46] | A | B | A | A | B | B | B | B |
| Average Particle Size of Slurry (μ)[47] | 4.6 | 3.6 | 9.7 | 9.0 | 7.3 | 7.8 | 5.9 | 14.0 |
| Firing Temp. (°C.)[48] | 1240 | 1180 | 1320 | 1320 | 1180 | 1220 | 1360 | 1200 |

Notes in Table 1

[1] to [4] The components of the vitreous china and the amounts thereof are determined in the following procedures:
① Crystals present in the material are identified and quantified by the X-ray diffraction analysis. In Table 1, the term "tr" means the fact that a specific crystal could be identified, but the amount thereof was less than the detection limit of the technique.
② All of the components are quantitatively analyzed for oxides constituting the components by the fluorescent X-ray analysis.
③ The value obtained in step ① is subtracted from the value determined in step ② and the value obtained is defined to be the component of the glass phase.
[5] The average particle size of the crystalline phase is determined by electron microscopic observation. The average particle size of quartz cannot be determined when the content thereof or the particle size thereof is extremely small and the data for these cases are not shown in Table 1.
[6] The data listed in Table 1 are determined according to the three-point bending test.
Size of Test Piece: 15 mm φ × 150 mm
Span: 100 mm
[7] Both ends of a green test piece having a size of 30 mm × 10 mm × 250 mm were held at a span of 200 mm to determine the degree of the sag in the central position of the test piece during sintering.
[8] The water absorption percentage is defined to be an increase in weight of each test piece observed when the test piece is completely dried, boiled up in water for 2 hours and then allowed to stand for 24 hours.
[9] Each test piece having a size of 30 mm × 10 mm × 125 mm was held at 100° C. for 3 hours, immersed in water maintained at 20° C. and then examined for the presence of any crack. If the test piece is free of any crack, the same procedures described above are repeated while the test piece is maintained at a temperature 10° C. higher than that initially used. The resistance to thermal shock is defined to be the difference between the holding temperature at which cracks are initially formed and the temperature of water.
[10] Main component: α-alumina having an avarage particle size of 40μ.
[11] Main component: α-alumina having an avarage particle size of 10μ.
[12] Main component: α-alumina having an avarage particle size of 5μ.
[13] Main component: α-alumina having an avarage particle size of 1.5μ.
[14] Main component: α-alumina having an avarage particle size of 0.4μ.
[15] Main component: quartz having an average particle size of 50μ.
[16] Main component: quartz having an average particle size of 35μ.
[17] Main component: quartz having an average particle size of 20μ.
[18] Main component: quartz having an average particle size of 7μ.
[19] Main component: quartz having an average particle size of 3μ.
[20] Product from Japan, massive form main components: quartz, kaolinite, potash feldspar, soda feldspar.
[21] Product from Japan, massive form main components; quartz, sericite, pyrophyllite, soda feldspar.
[22] Product from the Republic of Korea, massive form main components: quartz, sericite.
[23] Product from the People's Republic of China, massive form main components: quartz, sericite, kaolinite.
[24] Product from Japan, massive form main components: potash feldspar, soda feldspar, quartz, sericite.
[25] Product from Japan, average particle size: 10.5μ main components: potash feldspar, soda feldspar, quartz, sericite.
[26] Product from Japan, massive form main components: potash feldspar, soda feldspar, quartz, sericite.
[27] Product from Japan, average particle size: 7.5μ main components: potash feldspar, soda feldspar, quartz, sericite.
[28] Product from Canada, average particle size: 10μ main components: nephelite, potash feldspar, soda feldspar.
[29] Product from Canada, average particle size: 6μ main components: nephelite, potash feldspar, soda feldspar.
[30] Product from Japan, massive form main components: natural glass, quartz.
[31] Product from Japan, average particle size: 3.5μ main components: kaolinite, quartz, potash feldspar.
[32] Product from Japan, average particle size: 2.2μ main components: kaolinite, quartz.
[33] Product from the U.S.A., average particle size: 3.5μ main component: kaolinite.
[34] Product from the People's Republic of China, massive form main components: kaolinite, quartz.
[35] Product from the U.S.A., average particle size: 1.2μ main components: kaolinite, sericite, quartz.
[36] Product from U.K., average particle size: 2.5μ main components: kaolinite, sericite, quartz.
[37] Product from U.K., average particle size: 6.5μ main components: kaolinite, sericite.
[38] Product from U.K., average particle size: 4μ main components: kaolinite, sericite.
[39] Main component: dolomite having an average particle size of 4μ.
[40] Main component: petalite having an average particle size of 8μ.
[41] Main component: magnesium carbonate having an average particle size of 6μ.
[42] Main component: calcium carbonate having an average particle size of 3μ.
[43] Main component: talc having an average particle size of 5μ.
[44] Main component: barium carbonate having an average particle size of 7μ.
[45] The main mineral components of the raw material of vitreous china are classified into clays, feldspars, α-alumina and quartz in line with the foregoing standards. When a clay containing kaolinite, quartz and potash feldspar is, for instance, used as a raw material, all of these components of the clay are not assigned to the clays, but kaolinite, quartz and potash feldspar are assigned to clays, quartz and feldspars respectively. It should be noted that only main components are herein listed and accordingly, the sum of the contents thereof is not always equal to 100%.
[46] the methods for preparing slurries are classified into the following ones:
(A) All of the raw materials for the vitreous china are mixed and stirred in one lot without any pulverization step.
(B) A pot mill is charged with all of the raw materials for the vitreous china and the raw materials are pulverized till the particle size thereof reaches the value listed in the column of "average particle size of slurry" in Table 1.
(C) A pot mill is charged with raw materials for the vitreous china except for those to be added afterward for pulverization thereof till the particle size reaches a desired level, then the mill is charged with the raw materials to be post-added to pulverize the mixture for additional 30 minutes to give a raw material having a particle size level defined as "average particle size of slurry". In this respect, the raw materials to be post-added are indicated by the corresponding numbers thereof. For instance, "C (10) (15)" means the fact that alumina A and quartz sand A are post-added.
[47] The term "average particle size of slurry" means the particle size which is determined at a cumulative volume of 50% using a laser granulometer.
[48] The firing is carried out by oxidative firing in a gas oven or an electric furnace and the highest temperature on the heat curve is indicated.

TABLE 2

| Comp. Ex. No. | 1 | 2 | 3 | 4 |
|---|---|---|---|---|
| Bending Strength (kgf/cm²) | 810 | 750 | 720 | 420 |
| Young's Modulus (kgf/mm²) | 4800 | 4800 | 4400 | 3600 |
| Deg. of High Temp. Deformation (mm) | 28 | 30 | 25 | 20 |
| Water Absorption Percentage (%) | 0.08 | 0.10 | 0.35 | 1.40 |
| Resistance to Thermal Shock (°C.) | 130 | 110 | 130 | 100 |
| Firing Temp. (°C.) | 1190 | 1180 | 1150 | 1130 |

(Note)
These physical properties were determined in the same manner used for the determination of those listed in Table 1.

As seen from the data listed in Tables 1 and 2, the strength of the vitreous china of the present invention ranges from 1520 to 2950 kgf/cm$^2$ which is remarkedly higher than those observed on the conventional vitreous china, which ranges from 420 to 810 kgf/cm$^2$. Other physical properties of the vitreous china of the invention are also improved as compared with those for the conventional vitreous china and can be used in wide variety of applications (for instance, vitreous china having low or high degrees of deformation on heating; those substantially excellent in resistance to thermal shock; and those having very low firing temperatures).

Both the vitreous china obtained in Comparative Example 2 and Example 8 have the same firing temperature, i.e., 1180° C. Therefore, an identical glaze can be used in once firing step of these vitreous china (the term "once firing" means that a green vitreous china and a glaze applied thereto are fired by a single firing step).

In the conventional technique, a Bristol glaze for the vitreous china of Comparative Example 2 has the following composition expressed in accordance with Seger formula (mole %) except for an opacifier and stains: $SiO_2 + TiO_2$ 70; $Al_2O_3 + Fe_2O_3$ 6; CaO 14; MgO 2; ZnO 4; $K_2O + Na_2O$ 4.

Quartz sand, feldspar, lime, clay, alumina and magnesite are used as raw materials of the glaze, and the CaO component is substantially originated from lime ($CaCO_3$). This glaze conventionally used is applied to the green vitreous china obtained in Example 8 and fired at 1180° C. As a result, the "crawling" phenomenon was observed.

Thus, the foregoing conventional glaze in which wollastonite ($CaO \cdot SiO_2$) had been substituted for a part or whole of lime ($CaCO_3$) as a calcium source was applied to the vitreous china prepared in Example 8. In this respect, the amount of $SiO_2$ increased due to the addition of wollastonite was compensated by reducing the amount of quartz sand to be added. Thus, the resulting glaze satisfied, as a whole, the Seger formula of the conventional glaze. There were tentatively produced, a variety of sanitary-wares ranging from small-sized accessories to large-sized toilet stools.

As a result, it was found that the "crawling" phenomenon was not noticeable so much in case of small-sized accessories by substituting wollastonite for 5% of the calcium source, but this phenomenon was still conspicuous in large-sized articles at such a rate of substitution. As the rate of substitution was increased, the "crawling" phenomenon became insignificant and any large-sized article did not cause the "crawling" phenomenon at all when wollastonite was substituted for not less than 80% of the calcium source.

In addition, the foregoing conventional glaze, a part of which was replaced with a frit, was likewise applied to the basis material of Example 8. The frit used comprised 68 mole % of $SiO_2$, 9 mole % of $Al_2O_3$, 15 mole % of CaO and 8 mole % of $K_2O + Na_2O$. The addition of the frit was carried out in such a manner that the overall Serger formula was not changed by adjusting the mixing ratio of other raw materials like the foregoing case in which wollastonite was used. There were also tentatively produced, a variety of sanitary-wares ranging from small-sized accessories to large-sized toilet stools.

As a result, it was found that the "crawling" phenomenon was not noticeable so much in case of small-sized accessories by substituting the frit for 1% by weight of the glaze, but this phenomenon was still conspicuous in large-sized articles at such a rate of substitution. As the rate of substitution was increased, the "crawling" phenomenon became insignificant and any large-sized article did not cause the "crawling" phenomenon at all when the frit was substituted for not less than 15% by weight of the glaze. When the frit was substituted for not less than 20% by weight of the glaze, the properties thereof should be controlled by a method different from that required for the conventional glaze free of any frit. Therefore, the rate of substitution is preferably not more than 20% by weight.

When vitreous china of Comparative Example 2 was used to produce large-sized sanitary-wares, it was necessary to make the wall thickness of the product in the order of 9 to 15 mm because the vitreous china was low in mechanical strength and high in the degree of high temperature deformation. In contrast, when vitreous china of Example 8 was used, it was possible to make the wall thickness of the product smaller, i.e., in the order of 3 to 7 mm.

It would be clear from the foregoing explanation that the vitreous china and the method for preparing the same may permit the marked improvement of the mechanical strength of the vitreous china and that the mechanical strength may be improved without adversely affecting other physical properties (such as high temperature deformation, resistance to thermal shock and firing temperature). This vitreous china can be applied to sanitary-wares, large-sized pottery plates and various kinds of engineering ceramics. Moreover, the present invention provides a glaze which has excellent compatibility with vitreous china having high alumina contents and which is thus applied to a large-sized product formed from a vitreous china having such a high alumina content.

What is claimed is:

1. A method for preparing vitreous china which comprises the steps of molding by slip casting a raw material which comprises 20 to 65% by weight of clays, 4 to 35% by weight of feldspars, 10 to 60% by weight of $\alpha$-alumina and 1 to 40% by weight of quartz, drying the molded body and then firing it wherein, in the raw material, the average particle size of the $\alpha$-alumina ranges from 0.3 to 50$\mu$ and that of quartz ranges from 5 to 65$\mu$ and, in the crystalline phase, the average particle size of the $\alpha$-alumina ranges from 0.3 to 50$\mu$ and that of quartz is not more than 50$\mu$.

2. The method for preparing the vitreous china of claim 1 wherein a mineral raw material comprising at least one member selected from the group consisting of MgO, CaO, BaO and $Li_2O$ is added to the raw material as a chemical component of the glass phase in such an amount that the content of at least one member selected from the group consisting of MgO, CaO, BaO and $Li_2O$ is present in a finite amount up to 6% by weight while the total amount of the glass phase is defined to be 100% by weight.

3. The method for preparing the vitreous china of claim 2 wherein the mineral raw material is dolomite.

4. The method for preparing the vitreous china of claim 2 wherein, before molding, the raw material is pulverized.

5. The method for preparing the vitreous china of claim 4 wherein the step for pulverizing the raw material comprises pulverizing the raw material except for a part or all of the alumina and/or quartz and then adding the alumina and/or quartz to the pulverized product after the pulverization.

6. The method for preparing the vitreous china of claim 4 wherein, in the raw material, the overall average particle size of the raw material ranges from 1$\mu$ to 15$\mu$, and wherein, in the crystalline phase, the average particle size of $\alpha$-alumina ranges from 0.3 to 50$\mu$ and that of quartz is not more than 50$\mu$.

* * * * *